United States Patent
Yamashiro et al.

(10) Patent No.: US 10,438,250 B2
(45) Date of Patent: Oct. 8, 2019

(54) PARKING AUTOMATIC CHARGING APPARATUS FOR VEHICLE, CHARGING PROCESSING APPLICATION PROGRAM, AND PARKING AREA AUTOMATIC CHARGING SYSTEM

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 752 days.

(21) Appl. No.: 15/033,061

(22) PCT Filed: Oct. 30, 2014

(86) PCT No.: PCT/JP2014/005486
§ 371 (c)(1),
(2) Date: Apr. 28, 2016

(87) PCT Pub. No.: WO2015/064104
PCT Pub. Date: May 7, 2015

(65) Prior Publication Data
US 2016/0247210 A1     Aug. 25, 2016

(30) Foreign Application Priority Data
Nov. 1, 2013 (JP) .................................. 2013-228442

(51) Int. Cl.
*G07B 15/02* (2011.01)
*G06Q 30/04* (2012.01)
*H04W 4/02* (2018.01)

(52) U.S. Cl.
CPC .............. *G06Q 30/04* (2013.01); *G07B 15/02* (2013.01); *H04W 4/02* (2013.01); *G06Q 2240/00* (2013.01)

(58) Field of Classification Search
CPC .......... G06Q 30/04; G07B 15/02; H04W 4/02
(Continued)

(56) References Cited

U.S. PATENT DOCUMENTS 5,949,179 A    9/1999   Kumasaka et al.
6,493,676 B1 *   12/2002   Levy .................. G06Q 30/0284
                                                   705/13
(Continued)

FOREIGN PATENT DOCUMENTS

EP        0952557 A2    10/1999
GB        2432948 A     6/2007
(Continued)

OTHER PUBLICATIONS

Parking Enforcement Made Simple, https://web.archive.org/web/20190522172333/https://www.complusdata.com/handheld-mobile-license-plate-system/ (Year: 2019).*

Primary Examiner — Brian M Epstein
Assistant Examiner — Lisa Ma
(74) Attorney, Agent, or Firm — Harness, Dickey & Pierce, P.L.C.

(57) ABSTRACT

A vehicular parking automatic charging apparatus used in a vehicle includes a position acquirer that acquires a position of the vehicle, an area determiner that determines whether or not the position of the vehicle is in a charge parking area, a parking determiner that determines that the vehicle is placed in a parking state and that the parking state of the vehicle is ended, and a charging processor that executes a charge start process for starting charging on a basis that the position of the vehicle at a time when the parking determiner deter- (Continued)

mines that the vehicle is placed in the parking state is in the charge parking area, and that executes a charge end process for ending the charging on a basis that, after execution of the charge start process, the parking determiner determines that the parking state of the vehicle is ended.

9 Claims, 12 Drawing Sheets

(58) Field of Classification Search
USPC .......................................................... 705/13
See application file for complete search history.

(56) References Cited

U.S. PATENT DOCUMENTS

| | | | | |
|---|---|---|---|---|
| 2002/0024451 A1* | 2/2002 | Rosenberg | ............. | G07B 15/02 340/932.2 |
| 2002/0049630 A1 | 4/2002 | Furuta et al. | | |
| 2002/0128769 A1 | 9/2002 | Der Ghazarian et al. | | |
| 2009/0248577 A1 | 10/2009 | Hoj | | |
| 2012/0188101 A1* | 7/2012 | Ganot | .................... | G07B 15/02 340/932.2 |
| 2012/0218122 A1* | 8/2012 | Bogaard | ................. | G07B 15/02 340/870.03 |
| 2012/0280836 A1* | 11/2012 | Roesner | ............... | G08G 1/0175 340/932.2 |
| 2013/0265174 A1* | 10/2013 | Scofield | ................. | G01C 21/34 340/932.2 |
| 2013/0282448 A1 | 10/2013 | Rydbeck et al. | | |
| 2013/0297551 A1* | 11/2013 | Smith | ...................... | G06N 5/02 706/48 |
| 2014/0149454 A1* | 5/2014 | Eid | ........................ | G06F 16/381 707/769 |
| 2014/0232569 A1* | 8/2014 | Skinder | .................. | G01C 21/16 340/989 |
| 2014/0372185 A1* | 12/2014 | Ganot | .................... | G07B 15/02 705/13 |

FOREIGN PATENT DOCUMENTS

| | | |
|---|---|---|
| JP | H11121825 A | 4/1999 |
| JP | 2008123044 A | 5/2008 |
| JP | 2008129677 A | 6/2008 |
| WO | WO-2000067207 A1 | 11/2000 |
| WO | WO-2009023936 A1 * 2/2009 ............. G07C 5/006 |

* cited by examiner

PARKING AUTOMATIC CHARGING APPARATUS FOR VEHICLE, CHARGING PROCESSING APPLICATION PROGRAM, AND PARKING AREA AUTOMATIC CHARGING SYSTEM

CROSS REFERENCE TO RELATED APPLICATIONS

This application is a U.S. National Phase Application under 35 U.S.C. 371 of International Application No. PCT/JP2014/005486 filed on Oct. 30, 2014 and published in Japanese as WO 2015/064104 A1 on May 7, 2015. This application is based on and claims the benefit of priority from Japanese Patent Applications No. 2013-228442 filed on Nov. 1, 2013. The entire disclosures of all of the above applications are incorporated herein by reference.

TECHNICAL FIELD

The present disclosure relates to a parking automatic charging apparatus for vehicle, a charging processing application program, and a parking area automatic charging system for automatically performing charging processing for parking in a charge parking area.

BACKGROUND ART

A known charging system determines whether or not a vehicle passed through a charge area based on a result of positioning using a satellite positioning system and performs data processing for charging when it is determined that the vehicle passed through the charge area (e.g., Patent Document 1).

PRIOR ART LITERATURES

Patent Literature

Patent Literature 1: WO2000/67207A

SUMMARY OF INVENTION

In the technology of Patent Document 1, a toll is charged to a vehicle when the vehicle travels a toll road. In another example, a vehicle is charged when the vehicle is parked in a charge parking area. In the technology of Patent Document 1, mere presence of a vehicle in a charge area triggers the charging processing. However, in the parking, mere enter of a vehicle into a charge area should not cause the charging. Therefore, the technology of Patent Document 1 cannot apply to the charging processing when a vehicle is parked in a charge area.

The present disclosure is made in view of the foregoing. It is an object of the present disclosure to provide a parking automatic charging apparatus for vehicle, a charging processing application program, and a parking area automatic charging system that can automatically perform charging processing when a vehicle is parked in a charge parking area.

In an example for achieving the above object, a vehicular parking automatic charging apparatus used in a vehicle comprises: a position acquirer that acquires a position of the vehicle; an area determiner that determines whether or not the position of the vehicle is in a charge parking area; a parking determiner that determines that the vehicle is placed in a parking state and that the parking state of the vehicle is ended; and a charging processor that executes a charge start process for starting charging on a basis that the position of the vehicle at a time when the parking determiner determines that the vehicle is placed in the parking state is in the charge parking area, and that executes a charge end process for ending the charging on a basis that, after execution of the charge start process, the parking determiner determines that the parking state of the vehicle is ended.

In this vehicular parking automatic charging apparatus, the parking determiner automatically determines whether the vehicle is parked. When the parked position is in the charge parking area, the charging processor executes the charge start process for starting the charging, and thereafter, when the parking state is ended, the charging processor executes the charge end process for ending the charging. In this way, when the vehicle is parked in the charge parking area, the charge start process and the charge end process are automatically executed. Therefore, when the vehicle is parked in the charge parking area, the charging processing can be automatically performed.

In an example for achieving the above object, a charging processing application program causes a computer to function as the position acquirer, the area determiner, the parking determiner, and the charging processor of the above vehicular parking automatic charging apparatus. The charging processing application program may be provided in a form stored in a non-transitory storage medium or may be provided via a communication line. The charging processing application program can provide the same advantages as the above vehicular parking automatic charging apparatus.

In a parking area automatic charging system in a first example for achieving the above object, the position of the vehicle is included in at least one of the parking start notification or the parking end notification by the charging processor of the vehicular parking automatic charging apparatus. The parking area automatic charging system comprises the vehicular parking automatic charging apparatus and the charge management server. The charge management server includes: a storage storing a charge parking area information for determining a range of each charge parking area managed by the charge management server and a parking fee for the each charge parking area; a server-side charge-related communicator that performs wireless communication with the charge-related communicator of the vehicular parking automatic charging apparatus; and a charge amount calculator that determines the parking fee of the charge parking area in which the vehicle is parked, based on the position of the vehicle included in the parking start notification or the parking end notification transmitted from the charge-related communicator of the vehicular parking automatic charging apparatus, and that calculates a charge amount based on the parking fee and a time period from receipt of the parking start notification to receipt of the parking end notification.

In this parking area automatic charging system, the charge management server can determine what vehicle is parked in the charge parking area. Therefore, when different parking fees are set for different parking areas, an appropriate charge amount can be calculated.

In a parking area automatic charging system in a second example for achieving the above object, the vehicular parking automatic charging apparatus includes a periphery notifier. After execution of the charge start process and before execution of the charge end process by the charging processor, the periphery notifier informs a surrounding of the vehicle that the charge start process is executed. The periphery notifier is a short range communicator. After the execution of the charge start process and before the execution of the charge end process by the charging processor, the periphery notifier wirelessly transmits, to the surrounding of the vehicle, a proper parking signal indicating that the charge start process is executed. The parking area automatic charging system comprises the vehicular parking automatic charging apparatus and a manager-side apparatus used by a manager managing the charge parking area. The short range wireless communicator of the vehicular parking automatic charging apparatus transmits the proper parking signal so that the proper parking signal includes the position of the vehicle acquired by the position acquirer. The manager-side apparatus includes: a manager-side short range wireless receiver that receives the proper parking signal transmitted from the short range wireless communicator of the vehicular parking automatic charging apparatus; a display; and a display processor that causes the display to display a proper parking figure indicative of the vehicle transmitting the proper parking signal at a display position that is determined according to the position of the vehicle included in the proper parking signal received with the manager-side short range wireless communicator.

In this parking area automatic charging system, the proper parking figure corresponding to the vehicle not transmitting the proper parking signal to the surrounding is not displayed on the display. Therefore, by making a comparison between the position of the proper parking figure displayed on the display and the position of the vehicle actually parked in the charge parking area, it becomes possible to discover an illegally parked vehicle.

EMBODIMENTS FOR CARRYING OUT INVENTION

First Embodiment

Figure 1:
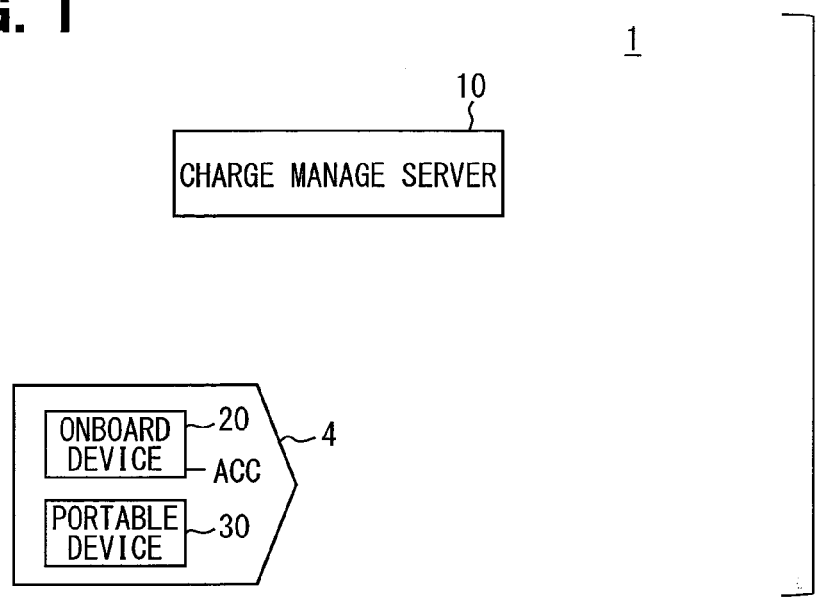
FIG. 1 is an outline configuration diagram of a parking area automatic charging system according to a first embodiment of the present disclosure.

Embodiments of the present disclosure will be described with reference to the drawings. As shown in FIG. 1, a parking area automatic charging system 1 of a first embodiment includes a charge management server 10, an onboard device 20, and a portable device 30. In the first embodiment, the portable device 30 corresponds to a vehicular parking automatic charging apparatus for a vehicle.

The onboard device 20 is mounted to a vehicle 4 and operates by being supplied with ACC (accessory) power of the vehicle 4. The onboard device 20 does not include a backup power source and stops operations of all functions immediately upon off of the ACC power.

The portable device 30 is used in the vehicle 4 together with the onboard device 20. Whereas these onboard device 20 and portable device 30 are used in the vehicle 4, the charge management server 10 is installed in a parking area management company or the like.

<Configuration of Charge Management Server 10>

Figure 2:
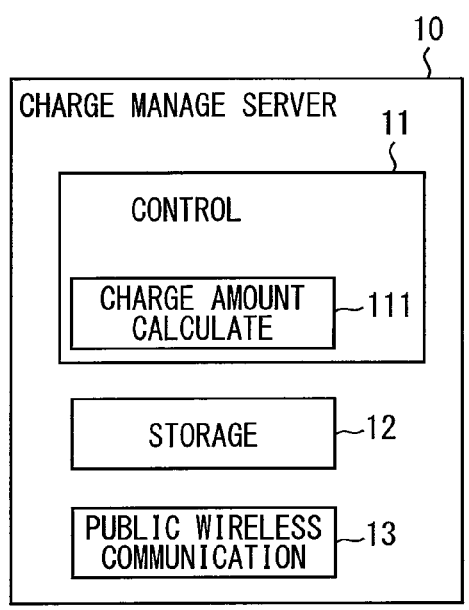
FIG. 2 is a block diagram illustrating a charge management server of a parking area automatic charging system.

As shown in FIG. 2, the charge management server 10 includes a controller 11, a storage 12, and a public wireless communicator 13. The controller 11 includes a computer with a CPU, a ROM, a RAM and the like. In the controller 11, the CPU executes a program stored in the ROM while using a temporary memory function of the RAM, thereby controlling the storage 12 and the public wireless communicator 13 and functions as a charge amount calculator 111.

The storage 12 stores charge parking area information for determining a range of each charge parking area managed by the charge management server 10. Additionally, parking fee of each charge parking area is stored.

The public wireless communicator 13 is a communication device for performing communications using a public communication network that is used for telephone calls and the like. The wireless communicator 13 receives the below described parking start notification and parking end notification from the portable device 30. To the portable device 30, the public wireless communicator 13 transmits the charge parking area information stored in the storage 12 and the below-described charge amount calculated by the charge amount calculator 111. The public wireless communicator 13 corresponds to a server side charge-related communicator.

The charge amount calculator 111 calculates a charge amount for the parking of the vehicle 4 associated with the portable device 30 in the charge parking area, based on the parking start notification and the parking end notification transmitted from the portable device 30 via the public communication network.

Processes of the charge amount calculator 111 will be specifically described later.

<Configuration of Onboard Device 20>

Figure 3:
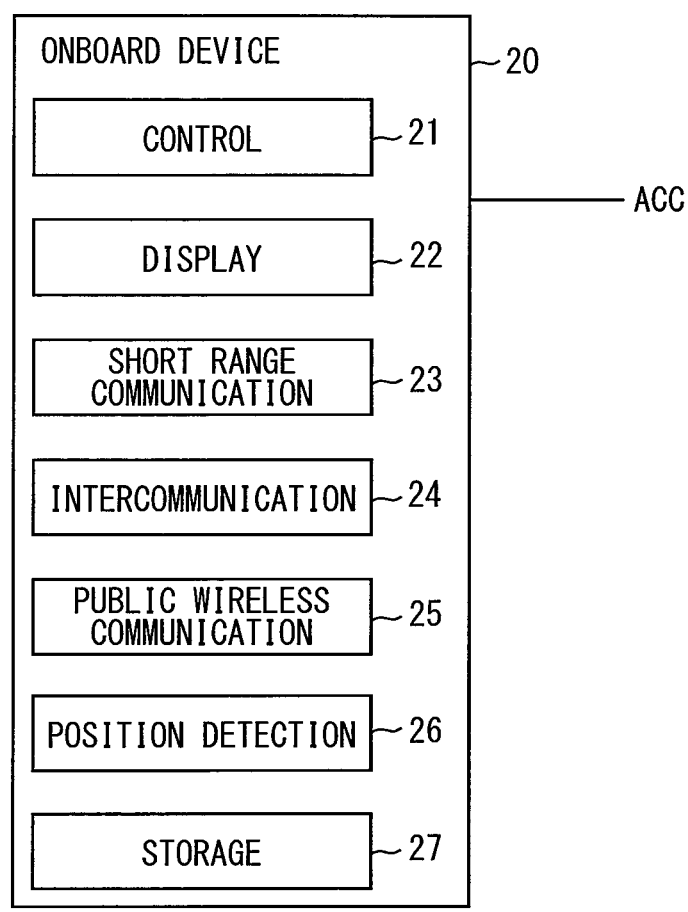
FIG. 3 is a block diagram illustrating an onboard device of a parking area automatic charging system.

As shown in FIG. 3, the onboard device 20 includes a controller 21, display 22, a short range wireless communicator 23, a mutual wireless communicator 24, a public wireless communicator 25, a position detector 26, and a storage 27. These parts 21 to 27 of the onboard device 20 of the first embodiment are accommodated in a single case (not shown).

The controller 21 includes a computer with a CPU, a ROM, a RAM and the like. In the controller 21, the CPU executes a program stored in the ROM while using a temporary memory function of the RAM, thereby controlling the display 22, the short range wireless communicator 23, the mutual wireless communicator 24, the public wireless communicator 25, the position detector 26, and the storage 27.

The display 22 of the present embodiment includes multiple LEDs and the light up state of the LEDs indicates operation states of the onboard device 20 and the like.

The short range wireless communicator 23 is a communication device for performing vehicle-to-vehicle communication and vehicle-to-road side communication and communicates with an onboard device 20 mounted to a different vehicle 4 and a road side device installed at a predetermined position of roads using radio waves with predetermined frequencies such as a 5.8 GHz band, a 700 MHz band and the like.

The mutual wireless communicator 24 is a communication device for communicating with the mutual wireless communicator 34 (see FIG. 4) of the portable device 30 carried into the vehicle 4 and has a shorter communication range than the above short range wireless communicator 23. In the present embodiment, the mutual wireless communicator 24 is a communication device for performing communications according to the wireless communication standards called Bluetooth (registered trademark).

The public wireless communicator 25 is a communication device for performing communications using a public communication network and is communicable with the public wireless communicator 13 of the charge management server 10 via the public communication network.

The position detector 26 includes a GNSS receiver for GNSS (Global Navigation Satellite System), which detects its own position based on a radio wave from a satellite. The position detector 26 detects a present position based on a signal received with the GNSS receiver.

The storage 27 includes a nonvolatile storage medium. The storage medium stores a charged-person ID. The charged-person ID identifies a person to be billed when the vehicle 4 is parked in the vehicle 4.

<Configuration of Portable Device 30>

Figure 4:
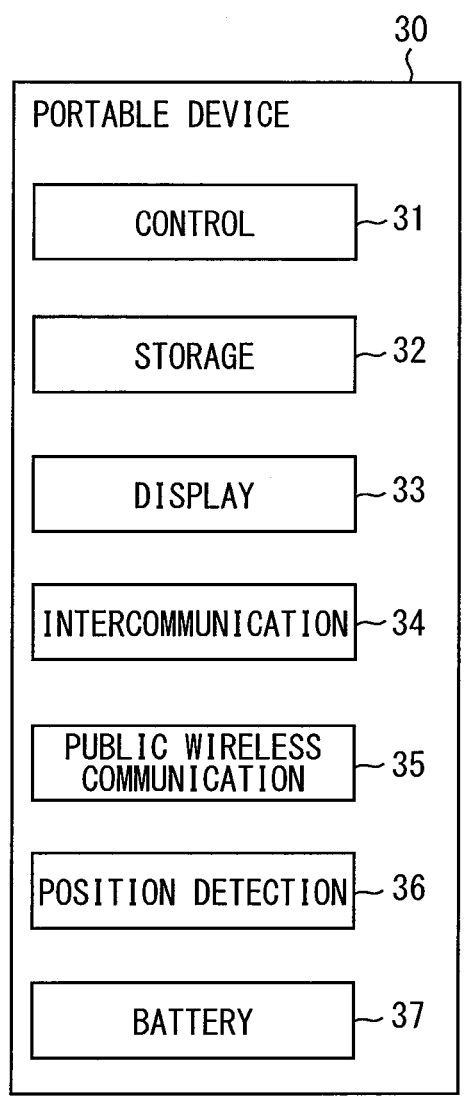
FIG. 4 is a block diagram illustrating a portable device of a parking area automatic charging system.

The portable device 30 in the present embodiment is a multifunction cellular phone called a smart phone. As shown in FIG. 4, the portable device 30 includes a controller 31, a storage 32, a display 33, a mutual wireless communicator 34, a public wireless communicator 35, a position detector 36 and a battery 37.

The controller 31 includes a computer with a CPU, a ROM, a RAM and the like. The controller 31 controls the storage 32, the display 33, the mutual wireless communicator 34, the public wireless communicator 35 and the position detector 36.

Figure 5:
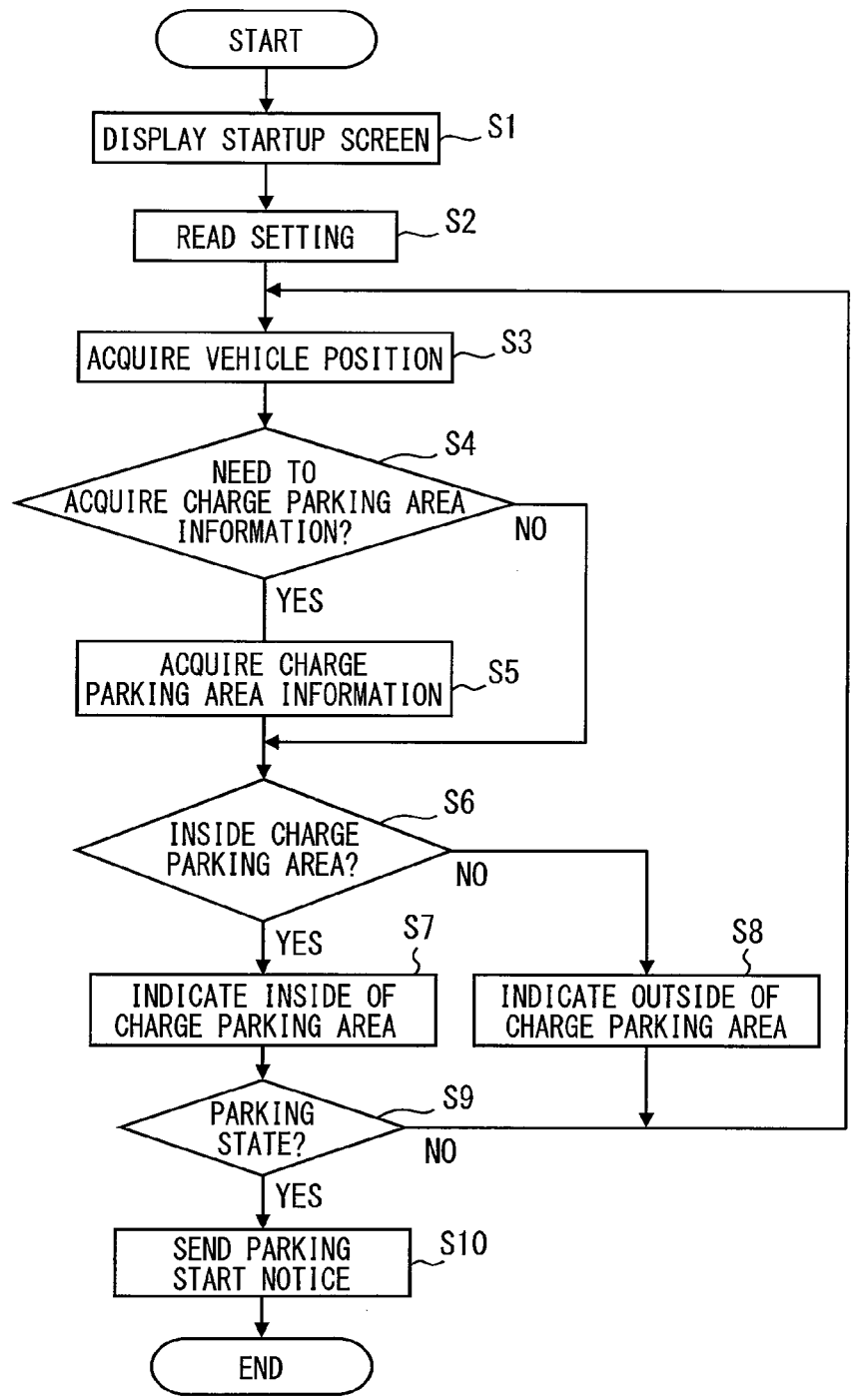
FIG. 5 is a flowchart illustrating processes in a charging processing application program executed by a controller of a portable device.
Figure 7:
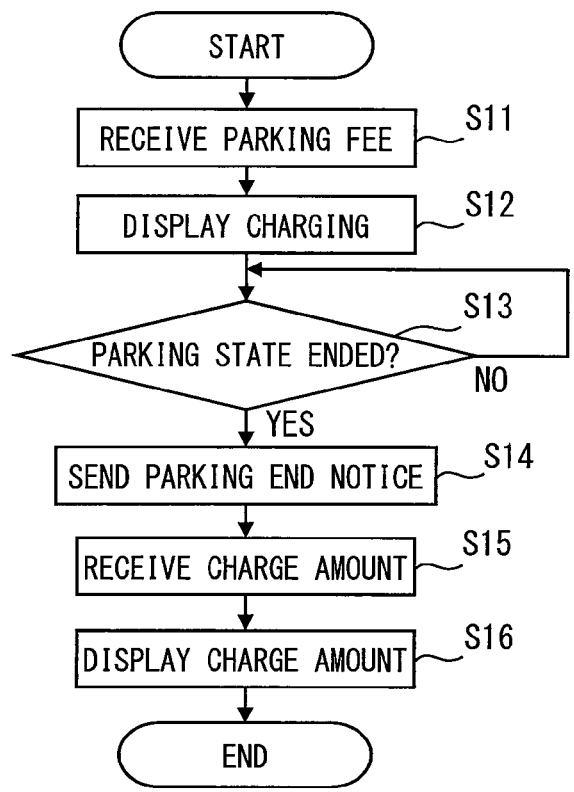
FIG. 7 is a flowchart illustrating processes in a charging processing application program executed by a controller of a portable device.

The storage 32 is a rewritable memory such as flash memory or the like, and stores various application programs. A charging processing application program illustrated in FIGS. 5 and 7 is stored as this application program. The storage 32 further stores the charge parking area information transmitted from the charge management server 10.

Figure 10:
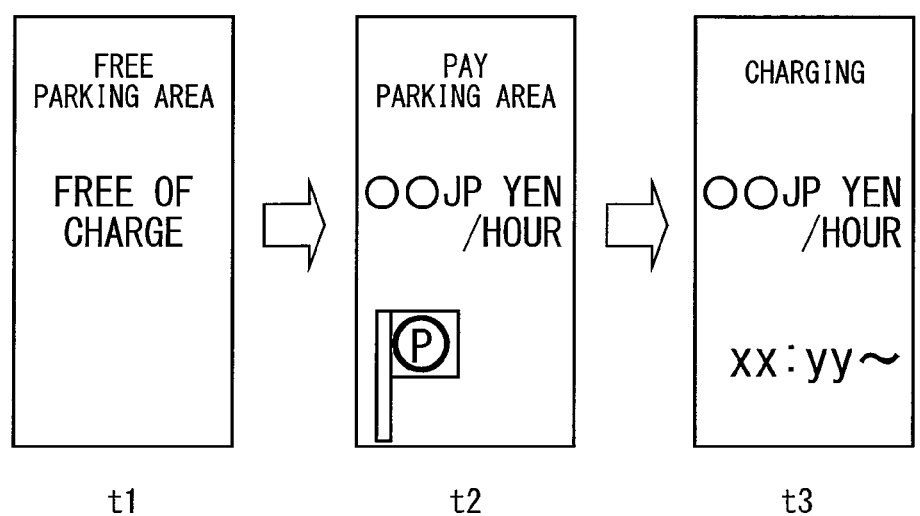
FIG. 10 is a diagram illustrating a charging state screen displayed at respective times of FIG. 9 on a display of a portable device.

The display 33 is a thin-type display such as a liquid crystal display or the like, and displays a charging state screen illustrated in FIG. 10 when the charging processing application program is executed.

The mutual wireless communicator 34 is a communication device for communicating with the mutual wireless communicator 24 of the onboard device 20 and performing communications according to the communication standards called Bluetooth.

The public wireless communicator 35 is a communication device for performing communications using a public communication network and is communicable with the public wireless communicator 13 of the charge management server 10 via the public communication network. The public wireless communicator 35 corresponds to a charge-related communicator.

The position detector 36 includes a GNSS receiver for GNSS and detects the present position based on a signal received with the GNSS receiver.

The battery 37 is a secondary battery and supplies power to the controller 31, the storage 32, the display 33, the mutual wireless communicator 34, the public wireless communicator 35, and the position detector 36. The battery 37 corresponds to a built-in power source.

<First Processes of Charging Processing Application Program>

The controller 31 executes the charging processing application program and first executes processes illustrated in FIG. 5. The charging processing application program is executed in response to a user touch operation on an icon (not shown) displayed on the display 33.

When a pairing operation has been already made and when a distance between the mutual wireless communicator 24 of the onboard device 20 and the mutual wireless communicator 34 of the portable device 30 each in an activated state become small, they are automatically placed in a connected relation.

At step S1, a predetermined startup screen is displayed on the display 33. At step S2, various setting values are read out. A user can reconfigure the various setting values by a configuration change operation (not shown).

At step S3 corresponding to a position acquirer, the vehicle position is acquired. The vehicle position may be acquired from the position detector 36 of the portable device 30. However, in this example, the present position acquired by the position detector 26 of the onboard device 20 is acquired as the vehicle position via the mutual wireless communicators 24, 34.

At step S4, it is determined whether acquisition of the charge parking area information is needed. The charge parking area information is, as described above, information for determining a range of a charge parking area. In the present embodiment, the charge parking area is assumed to be a rectangle. The charge parking area information has three information items, a first and a second of which are coordinate points of two points connecting a diagonal line, and a third of which is a rotation angle θ of the rectangle. The zero degree of the rotation angle θ corresponds to north.

Figure 8:
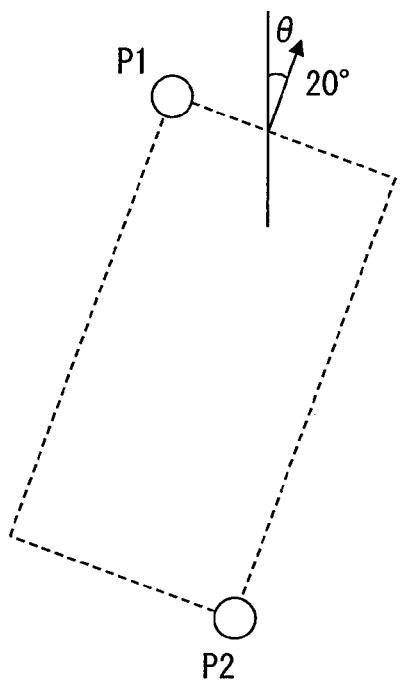
FIG. 8 is a diagram for explaining three information items for specifying a range of a charge parking area.

As shown in FIG. 8, the rectangle is uniquely determined by the three information item, the coordinate points of the two points P1, P2 connecting the diagonal line and the rotation angle θ. The use of these three information items to show a range of the rectangular charge parking area can reduce an amount of data as compared with use of coordinate points of four points of a rectangle to show the range of the rectangular charge parking area.

At step S4, stored contents of the storage 32 are matched against the vehicle position acquired at step S3. When the charge parking area information representing charge parking areas within a predetermined distance from the vehicle position is not stored in the storage 32, it is determined that the acquisition of the charge parking area information is needed. Additionally, even when the charge parking area information representing charge parking areas within the predetermined distance from the vehicle position is stored in the storage 32, if a reference period of days has elapsed since the acquisition time of this charge parking area information, it may be determined that the acquisition of the charge parking area information is needed.

When it is determined that the acquisition of the charge parking area information is needed (S4: Yes), the processing proceeds to step S5. When it is determined that the acquisition of the charge parking area information is not needed (S4: No), the processing proceeds to step S6.

At step S5, the charge parking area information representing charge parking areas within the predetermined distance from the vehicle position acquired at step S3 is acquired from the charge management server 10 and stored in the storage 32. Specifically, a request for the charge parking area information representing charge parking areas within the predetermined distance from the vehicle position is transmitted to the charge management server 10 by using the public wireless communicator 35. In response to this signal, the public wireless communicator 13 of the charge management server 10 transmits the charge parking area information and the public wireless communicator 35 receives the charge parking area information. The received charge parking area information is stored in the storage 32.

At step S6 corresponding to an area determiner, it is determined whether the vehicle position is in a charge parking area. This determination is made by comparing between the vehicle position acquired at step S3 and a range of each charge parking area indicated by the charge parking area information stored in the storage 32.

When it is determined that the vehicle position is in any of the charge parking areas (S6: Yes), the processing proceeds to step S7. When it is determined that the vehicle position is not in any of the charge parking areas (S6: No), the processing proceeds to step S8.

At step S7, a screen indicating the inside of the charge parking area is displayed as the charging state screen on the display 33. At step S8, a screen indicating the outside of the charge parking area, that is, a screen indicating that the present position is in a free parking area, is displayed as the charging state screen on the display 33.

After executing step S7 or step S8, the processing proceeds to step S9. At step S9, it is determined whether or not the subject vehicle, which is the vehicle mounted with the onboard device 20, is in the parking state. In the present embodiment, it is determined that the vehicle is placed in the parking state when the connection between the mutual wireless communicator 34 of the portable device 30 and the mutual wireless communicator 24 of the onboard device 20 is disconnected.

As described above, the onboard device 20 operates by being supplied with the ACC power. When the vehicle 4 becomes the parking state, the ACC power is turned off, and accordingly, the connection between the mutual wireless communicator 34 of the portable device 30 and the mutual wireless communicator 24 of the onboard device 20 is disconnected. In view of this, the present embodiment determines the parking state based on the disconnection of the connection between the mutual wireless communicator 34 of the portable device 30 and the mutual wireless communicator 24 of the onboard device 20.

When it is determined that the vehicle is not in the parking state (S9: No), the processing returns to step S3. When it is determined that the vehicle is in the parking state (S9: Yes), the processing proceeds to step S10. It is noted that the step S9 is executed when it is determined that the vehicle is in the charge parking area. Thus, when it is determined at step S9 that the vehicle is in the parking state, this indicates the parking in the charge parking area.

At step S10, the parking start notification is transmitted to the charge management server 10 by using the public wireless communicator 35. Step S10 corresponds to a charge start process.

The parking start notification transmitted at step S10 includes a parking start time, a charged-person ID, and a parking position. The charged-person ID may be acquired from the onboard device 20 beforehand or at this step S10. Because the parking start time is substantially the same as a transmission and reception time of the parking start notification, the parking start notification may not include the parking start time.

<Processes of Charge Amount Calculator 111>

Figure 6:
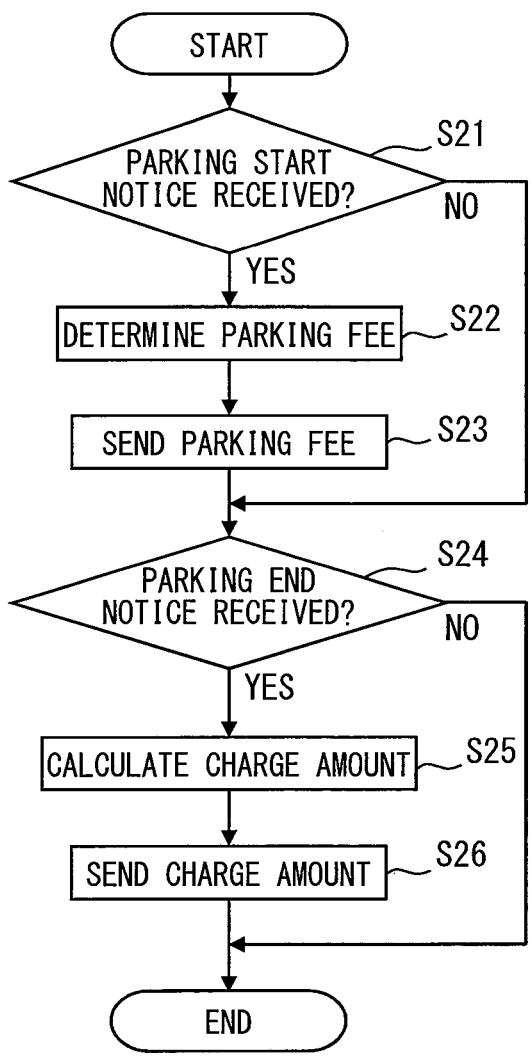
FIG. 6 is a flowchart illustrating processes in a charge amount calculator of a charge management server

The charge amount calculator 111 of the controller 11 of the charge management server 10 performs processing illustrated in FIG. 6 at constant cycles. At step S21, it is determined whether or not the parking start notification is received with the public wireless communicator 13. When this determination results in Yes, the processing proceeds to step S22. When this determination results in No, the processing proceeds to step S24.

At step S22, the parking fee is determined. Specifically, first, the charge parking area is specified from the parking position included in the parking start notification and the charge parking area information stored in the storage 12. The parking fee of the specified charge parking area is selected from the parking fees of the respective charge parking areas stored in the storage 12. The parking fee is typically a fee per hour. This fee for hour may vary depending on times. The parking fee may be a fee per day depending on charge parking areas.

At step S23, the parking fee determined at step S22 is transmitted to the portable device 30 which transmitted the parking start notification.

At step S24, it is determined whether or not the parking end notification is received. The parking end notification is a notification that is transmitted in the processing illustrated in FIG. 7 from the portable device 30 used in the vehicle 4. This parking end notification includes the charged-person ID and the parking end time. In this regard, because the parking ends time is substantially the same as the time of transmission and receipt of the parking end notification; the parking end notification may not include the parking end time.

Based on the charged-person ID included in the parking end notification, the determination at step S24 is made for each parking start notification received at step S21. When at least one ID identical to the charged-person ID of the received parking start notification has been received, step S24 is determined as Yes. When the determination at step S24 results in Yes, the processing proceeds to step S25. When the determination at step S24 results in No, the processing of FIG. 6 is ended.

At step S25, the charge amount is calculated. The charge amount is determined from the parking time and the parking fee. The parking time is calculated from the parking start time and the parking end time. The parking fee is determined in the way that was above described for step S22.

At step S26, the charge amount determined at step S25 is transmitted to the portable device 30 which transmitted the parking end notification.

<Second Processes of Charging Processing Application Program>

While executing the charging processing application program, the controller 31 of the portable device 30 executes processing illustrated in FIG. 7 after S10 of FIG. 5.

At step S11, the parking fee of the charge parking area in which the vehicle 4 is presently parked is received from the charge management server 10. The charge management server 10 transmits this parking fee at the above-described step S23 of FIG. 6.

At step S12, the screen illustrating that the charging is occurring is displayed as the charging state screen on the display 33. The screen illustrating that the charging is occurring may display the parking fee received at step S11 and the parking start time. Step S12 and steps S7 and S8 of FIG. 5 corresponding a charging state processor.

At step S13, it is determined whether or not the parking state is ended. In the present embodiment, the end of the parking state is determined when the wireless communication between the mutual wireless communicator 34 of the portable device 30 and the mutual wireless communicator 24 of the onboard device 20 are wirelessly reconnected. Step S13 and the above-mentioned step S9 correspond to a parking determinator.

As described above, when the paring of the portable device 30 and the onboard device 20 was beforehand made and the distance between the mutual wireless communicator 24 of the onboard device 20 and the mutual wireless communicator 34 of the portable device 30 each in the activated state become small, they are automatically placed in the connected state. Additionally, the onboard device 20 is supplied with the ACC power and operates. Thus, when the portable device 30 is carried into the vehicle 4 and the ACC power of the vehicle 4 is turned on, the reconnection is made between the wireless communicator 34 of the portable device 30 and the mutual wireless communicator 24 of the onboard device 20. The turn on of the ACC is regarded as a change of the vehicle 4 from the parking state to a stop state, that is, regarded as the end of the parking state.

Thus, in the present embodiment, the end of the parking state is determined from the reconnection between the mutual wireless communicator 34 of the portable device 30 and the mutual wireless communicator 24 of the onboard device 20. During No at step S13, step S13 is repeatedly executed. During respective execution of step S13, when a time period equal to or longer than a screen off time configured in the portable device 30 has elapsed, the display 33 is turned off even if a screen off process is not performed in the charging processing application program.

When step S13 results in Yes, the processing proceeds to step S14. At step S14, the parking end notification is transmitted to the charge management server 10 by using the public wireless communicator 35. Step S14 corresponds to a charge end process. Step S14 and step S10 correspond to a charging processor. As described above, upon receipt of the parking end notification, the charge management server 10 calculates and transmits the charge amount (S25, S26 in FIG. 6).

At step S15, the charge amount transmitted from the charge management server 10 is received. At step S16, the charge amount received at step S15 is displayed on the display 33.

<Position of Vehicle 4 and Display Example of Display 33>

Figure 9:
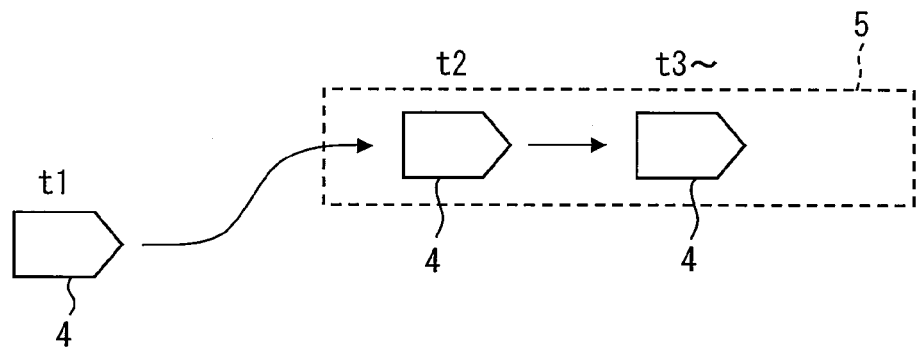
FIG. 9 is a diagram for explaining states where a vehicle enters into a charge parking area from an outside and is parked.

Next, the charging state screen displayed on the display 33 of the portable device 30 in the execution of the charging processing application program will be described. FIG. 9 illustrates temporal movement positions of the vehicle 4. The vehicle 4 is located outside the charge parking area 5 at a time t1 and enters into the charge parking area 5 at a time t2. At the time t2, the vehicle 4 is still moving and not parked yet. From a time t3, the vehicle 4 is in the parking state in the charge parking area 5.

FIG. 10 illustrates display examples of the display 33 corresponding to times t1 to t3 of FIG. 9. At the time t1, the vehicle 4 has not entered in the charge parking area 5 yet. Thus, step S8 of FIG. 5 is executed, so that the screen indicating the present position is in the free parking area is displayed on the display 33 as the parking state screen.

At the time t2, although the vehicle 4 is in the charge parking area 5, the vehicle is not in the parking state. Thus, step S7 of FIG. 5 is executed, so that the screen indicating the present position is in the charge parking area is displayed on the display 33 as the parking state screen. On this screen, the parking fee is further displayed.

At the time t3, the vehicle 4 is in the parking state in the charge parking area. Thus, step S12 of FIG. 7 is executed, so that the screen indicating that the charging is occurring is displayed as the parking state screen on the display 33. The parking fee and the parking start time are further displayed on the screen indicating that the charging is occurring.

Advantages of First Embodiment

In the above described first embodiment, the portable device 30 automatically determines (S6, S9) whether or not the vehicle 4, into which this portable device 30 is carried, is placed in the parking state in the charge parking area. When the start of the parking state is determined, the parking start notification is transmitted to the charge management server 10 (S10). When the end of the parking state of the vehicle 4 is determined, the parking end notification is transmitted to the charge management server 10 (S13, S14).

Because the parking start notification and the parking end notification are automatically transmitted to the charge management server 10 in the above ways when the vehicle 4 is parked in the charge parking area, it becomes possible to automatically charge for the parking of the vehicle 4 in the charge parking area.

Moreover, because the parking start notification includes the parking position, the charge management server 10 can determine in what charge parking area the vehicle 4 is parked. Thus, different parking fees can be set for different charge parking areas.

Moreover, in the first embodiment, the charging state screen indicative of the charging state is displayed on the display 33. The charging state screen selectively displays (1) the screen indicating that the present position is in the free parking area, (2) the screen indicating that the present position is in the charge parking area, and (3) the screen indicating that the charging is occurring. Before parking, the displays (1) and (2) can inform the occupant of the vehicle 4 whether or not the parking of the vehicle 4 leads to the charging. The display (3) can inform whether or not the charging processing is actually in progress.

Moreover, in the first embodiment, the charging state screen is displayed on the display 33 of the portable device 30. The parking start time and the parking fee are further displayed on the screen indicating that the charging is occurring. Therefore, even when one is distant form the vehicle 4, he or she can be informed when the vehicle 4 was parked in the charge parking area by checking the screen indicating that the charging is occurring. Additionally, it becomes possible to calculate the parking time from the present time and the parking start time displayed on the screen indicating that the charging is occurring, and, without returning back to the vehicle 4, it becomes possible to calculate the present charge amount from the parking time and the parking fee displayed on the screen indicating that the charging is occurring.

Moreover, in the first embodiment, the portable device 30 illustrated as a smart phone executes the charging processing application program so that the portable device 30 function as a vehicular parking automatic charging apparatus. Therefore, it is not necessary to separately provide a vehicular parking automatic charging apparatus.

Moreover, in the first embodiment, the onboard device 20 operates with the ACC power. Thus, installation in the vehicle 4 can be facilitated because the electric power can be obtained from an accessory socket. In this regard, immediately after the cut of the ACC power, all functions cannot operate, and thus, the onboard device 20 cannot determine that the vehicle 4 is parked. However, in the first embodiment, the start of the parking state is determined from the disconnection of the connection between the mutual wireless communicator 34 of the portable device 30 and the mutual wireless communicator 24 of the onboard device 20. In this way, by using the onboard device 20 operating with the ACC power, it can be determined that the vehicle 4 is placed in the parking state.

Second Embodiment

A second embodiment will be described. In the description of the second embodiment, elements assigned the same references as used before are the same as those described in the preceding embodiment, otherwise specified. When part of a configuration is described, the preceding embodiment is applicable to the other of the configuration.

<Outline Configuration of Parking Area Automatic Charging System 100 of Second Embodiment>

Figure 11:
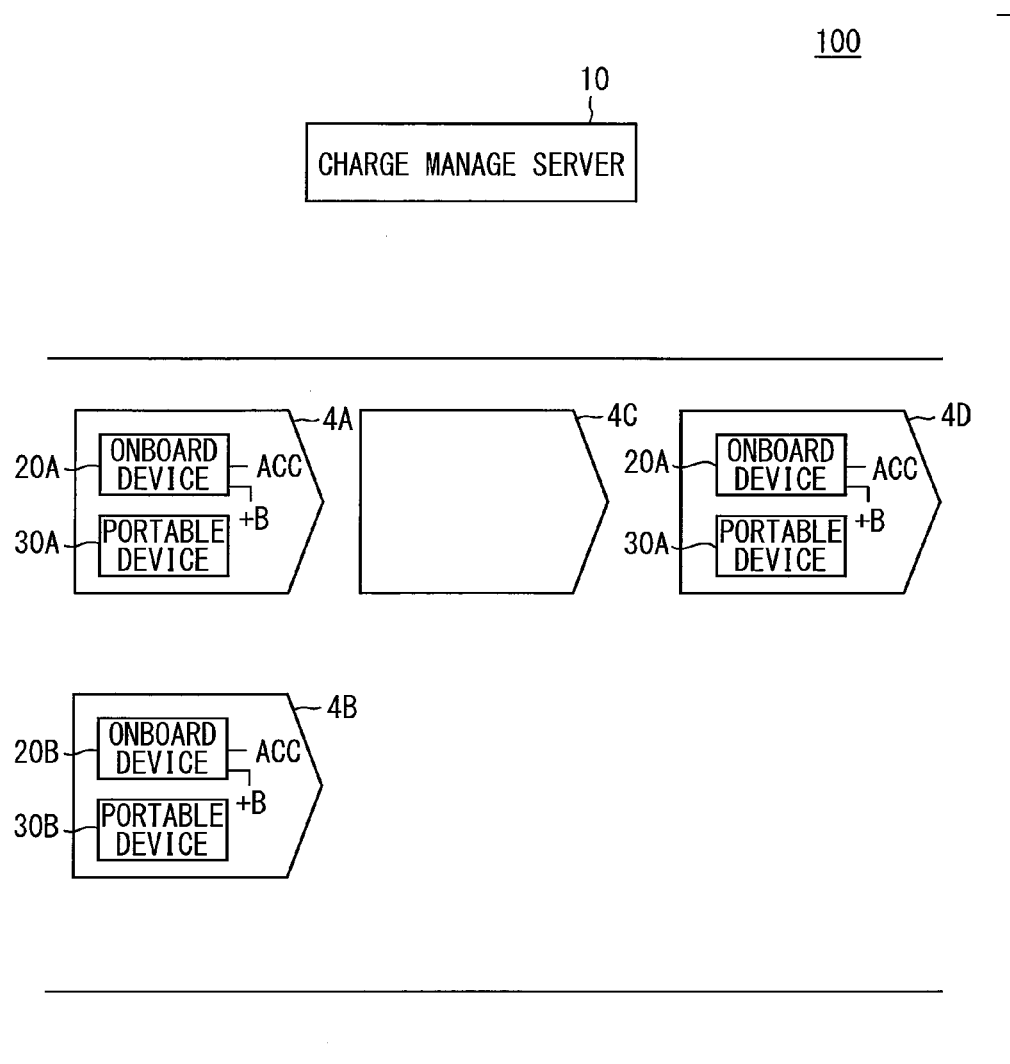
FIG. 11 is an outline configuration diagram of a parking area automatic charging system according to a second embodiment of the present disclosure.

As shown in FIG. 11, a parking area automatic charging system 100 of a second embodiment includes two kinds of onboard device 20A, 20B each different from the onboard device 20 of the first embodiment and two kinds of portable devices 30A, 30B each different from the portable device 30 of the first embodiment. The charge management server 10 is the same as in the first embodiment.

The onboard device 20A and the portable device 30A in combination are used in each vehicle 4A, 4D of a user who uses a charge parking area. The onboard device 20B and the portable device 30B in combination are used in a vehicle 4B of a manager who manages charge parking areas. In the second embodiment, the onboard device 20A and the portable device 30A correspond to a vehicular parking automatic charging apparatus. The onboard device 20B and the portable device 30B correspond to a manager-side apparatus. A short range wireless communicator 23 of the onboard device 20B corresponds to a manager-side short range wireless receiver.

In the parking area automatic charging system 1 of the first embodiment, even when the vehicle 4 is parked in the charge parking area, the charging is performed only when the parking start notification is transmitted to the management server 10. Therefore, there is possibility that some users attempt to avoid the charging by using an injustice means which prohibits the transmission of the parking start notification to the charge management server 10. For example, the vehicle 4C in FIG. 11 does not have the onboard device 20A and the portable device 30A, the parking start notification is not transmitted from the vehicle 4C.

In the parking area automatic charging system 100 of the second embodiment, the onboard device 20B and the portable device 30B are used to discover an illegally parked vehicle, that is, a vehicle that is parked in the charge parking area without transmitting the parking start notification to the charge management server 10.

<Hardware Configurations of Onboard Devices 20A, 20B and Portable Devices 30A, 30B>

In the second embodiment, the onboard devices 20A, 20B are connected to not only the ACC power but also an always-on power source (+B). Thus, even when the ACC power supply is turned off, the onboard devices 20A, 20B continue operating. The other hardware configurations are the same as those in the first embodiment illustrated in FIG. 3. Hardware configurations of the portable devices 30A, 30B are the same as those in the first embodiment illustrated in FIG. 4.

<Processes of Charging Processing Application Program in Second Embodiment>

The portable device 30A in the second embodiment also executes a charging processing application program. The charging processing application program of the second embodiment is the same at that of the first embodiment, except for portions described with FIGS. 12 and 13.

Figure 12:
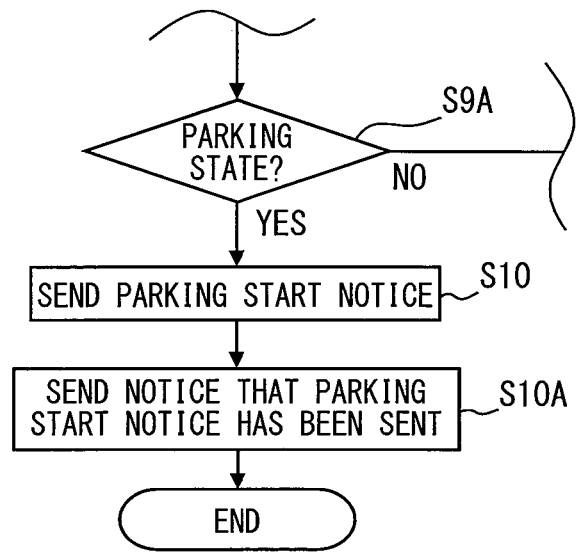
FIG. 12 is a flowchart illustrating part of processes in a charging processing application program executed by a controller of a portable device in a second embodiment.

At step S9A in FIG. 12, it is determined whether or not the parking state is started. As described later, in the second embodiment, the onboard device 20A determines the parking state. When it is determined that the parking state is started, the onboard device 20A notifies the portable device 30A that the parking state is started. At step S9A, it is determined whether the parking state is started, based on whether or not there is a notification from the onboard device 20A that the parking state is started.

When it is determined that the parking state is started (S9A: Yes), the parking start notification is transmitted to the charge management server 10 (S10) as in the first embodiment. Additionally, in the second embodiment, at step S10A, a parking start transmission completion notification indicating that the parking start notification has been transmitted to the charge management server 10 is transmitted to the onboard device 20A by using the mutual wireless communicator 34.

Figure 13:
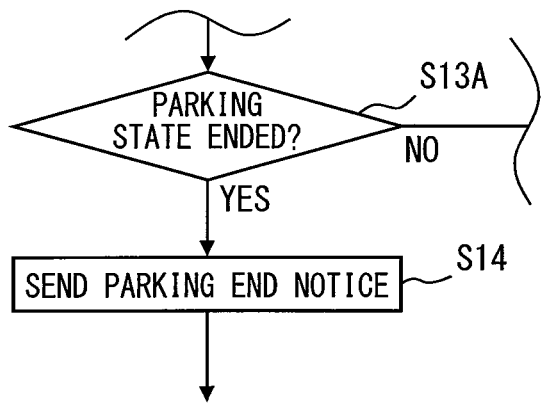
FIG. 13 is a flowchart illustrating part of processes in a charging processing application program executed by a controller of a portable device in a second embodiment.

At step S13A in FIG. 13, it is determined whether or not the parking state is started. As described below, in the second embodiment, the onboard device 20A determines the end of parking. When the end of parking is determined, the onboard device 20A notifies the end of parking to the portable device 30A. At this step S13A, it is determined whether or not the parking state is maintained, based on whether or not the end of parking is notified from the onboard device 20A.

When it is determined that the parking state is ended (S13A: Yes), the parking end notification is transmitted to the charge management server 10 (S14) as in the first embodiment.

<Processes of Controller 21 of Onboard Device 20A>

Figure 14:
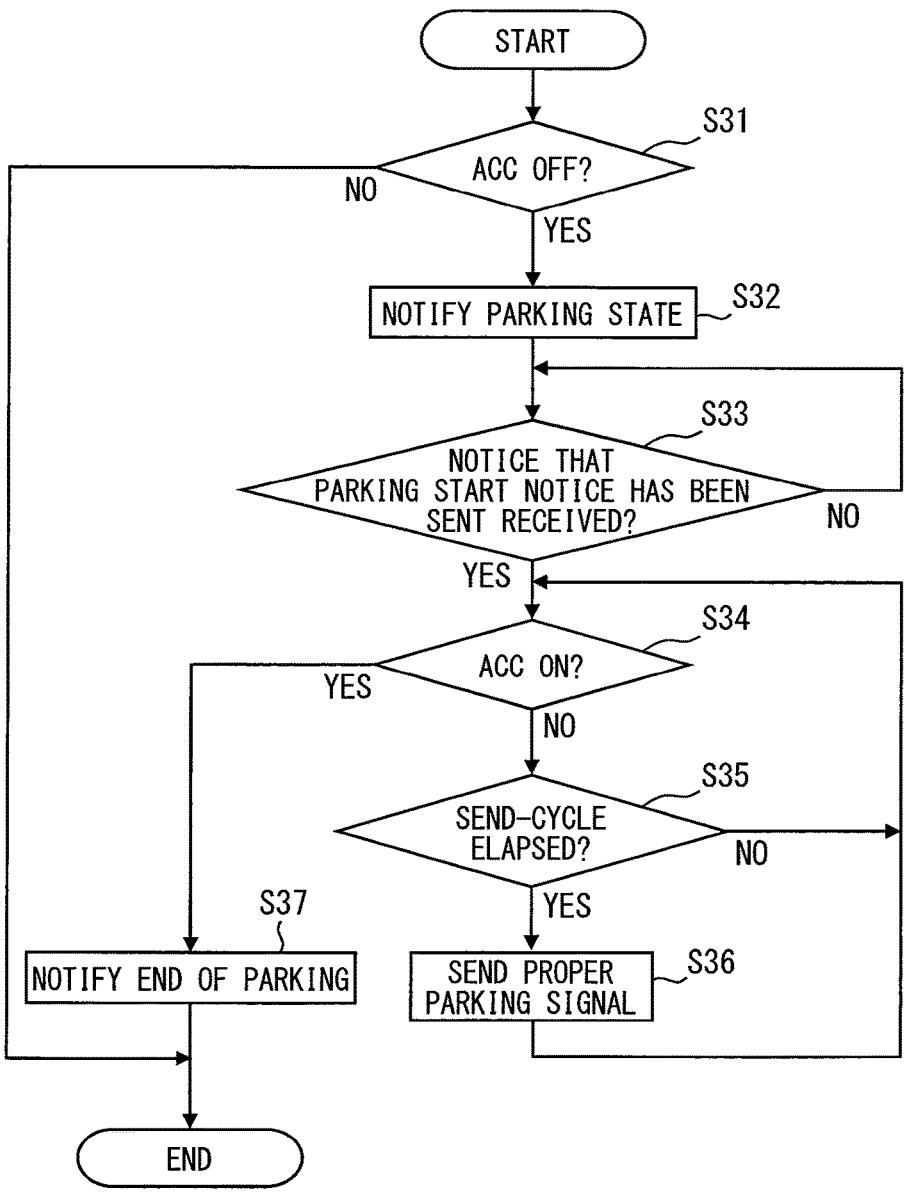
FIG. 14 is a flowchart illustrating processes executed by a controller of an onboard device in a second embodiment.

In the second embodiment, the controller 21 of the onboard device 20A of a user repeatedly executes processing illustrated in FIG. 14 at constant cycles. At step S31, it is determined whether or not the ACC power is turned off. When this determination results in No, the processing of FIG. 14 is ended. When the determination at step S31 results in Yes, the processing proceeds to step S32.

At step S32, the start of the parking state is notified to the portable device 30A via the mutual wireless communicator 24. Upon receipt of this notification, the portable device 30A determines the start of the parking state and transmits the parking start notification to the charge management server 10 (S10) as described above, and further transmits the parking start transmission completion notification to the onboard device 20A (S10A).

At step S33, it is determined whether or not this parking start transmission completion notification is received. When the determination at step S33 results in No, step S33 is repeated. When the determination at step S33 results in Yes, the processing proceeds to step S34.

At step S34, it is determined whether or not the ACC power is turned on. When this determination results in No, the processing proceeds to step S35. When this determination results in Yes, the processing proceeds to step S37.

At step S35, it is determined whether or not an elapsed time from transmission of a proper parking signal at the below described step S36 is equal to or longer than a transmission cycle. The transmission cycle is settable to an arbitrary value and may be set to a value in a range between 1 second to 10 seconds.

A wireless communicator used in vehicle-to-vehicle communications is prescribed such that, during traveling, it transmits information at 100 ms cycles (corresponding to during-traveling cycles). Therefore, when the transmission cycle is set to a value in a range between 1 second to 10 seconds, the transmission cycle of the proper parking signal is longer than an information transmission cycle during traveling. When the elapsed time is smaller than the transmission cycle (S35: No), the processing returns to step S34. When the elapsed time is equal to or larger than the transmission cycle, the processing proceeds step S36.

At step S36, by broadcasting, the proper parking signal is transmitted to a surrounding of the vehicle 4 by using the short range wireless communicator 23. The proper parking signal indicates that the parking start notification has been transmitted to the charge management server 10. The proper parking signal includes the vehicle position. The position detected by the position detector 26 is used as the vehicle position and represented by latitude and longitude.

After execution of step S36, the processing returns to step S34. Thus, in the second embodiment, during the parking state, the proper parking signal is cyclically transmitted to the surrounding.

When step S34 results in Yes, specifically, when the ACC is turned on, the processing proceeds to step S37. At step S37, the end of parking is notified to the portable device 30A via the mutual wireless communicator 24. By receiving this notification, the portable device 30A makes the Yes determination at step S13A in FIG. 13.

After execution of step S37, the processing of FIG. 14 is ended. Accordingly, the ACC is turned on and the transmission of the proper parking signal is ended.

<Processes of Onboard Device 20B of Manager>

Figure 15:
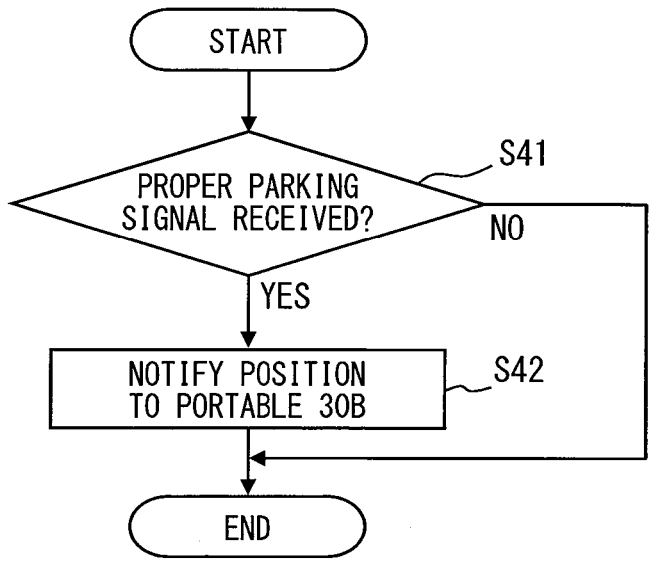
FIG. 15 is a flowchart illustrating processes executed by a controller of an onboard device in a second embodiment.

The onboard device 20B of the manager, more precisely, the controller 21 of the onboard device 20B, repeatedly performs processing of FIG. 15 at constant cycles. At step S41, it is determined whether or not the proper parking signal is received with the short range wireless communicator 23. In the second embodiment, the short range wireless communicator 23 of the onboard device 20B corresponds to a manager-side short range wireless communicator.

When the determination at step S41 results in No, the processing of FIG. 15 is ended. When the determination at step S41 results in Yes, the processing proceeds to step S42.

As described above, the proper parking signal includes the position of the onboard device 20 transmitting this proper parking signal. At step S42, the position included in the proper parking signal is notified to the portable device 30B by using the mutual wireless communicator 24.

<Processes of Portable Device 30B of Manager>

Figure 16:
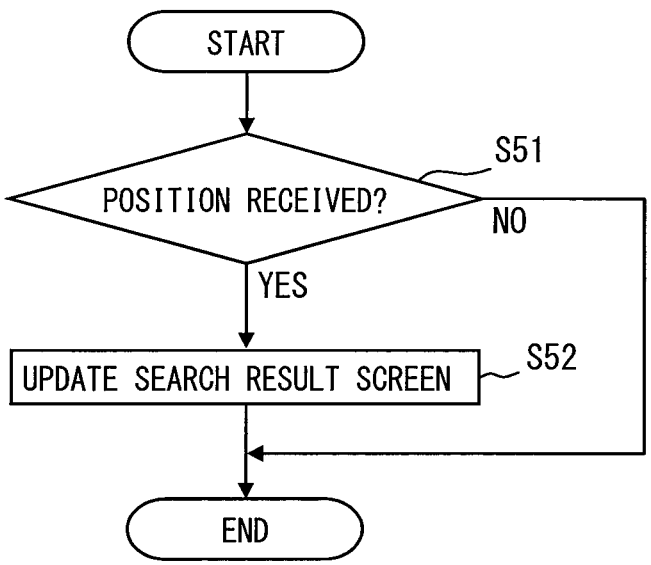
FIG. 16 is a flowchart illustrating processes executed by a controller of an onboard device in a second embodiment.

The portable device 30B of the manager, more precisely, the controller 31 of the portable device 30B, repeatedly performs processing of FIG. 16 at constant cycles. At step S51, it is determined whether or not the position of the vehicle 4 parked in the charge parking area is received with the mutual wireless communicator 34. When this determination results in No, the processing of FIG. 16 is ended. When this determination at step S51 results in Yes, the processing proceeds to step S52.

At step S52, a search result screen displayed on the display 33 is updated based on the position of the vehicle 4 received at step S51. In the second embodiment, the controller 31 of the portable device 30B functions as a display processor.

<Concrete Examples of Discovering Illegal Conducts>

Figure 17:
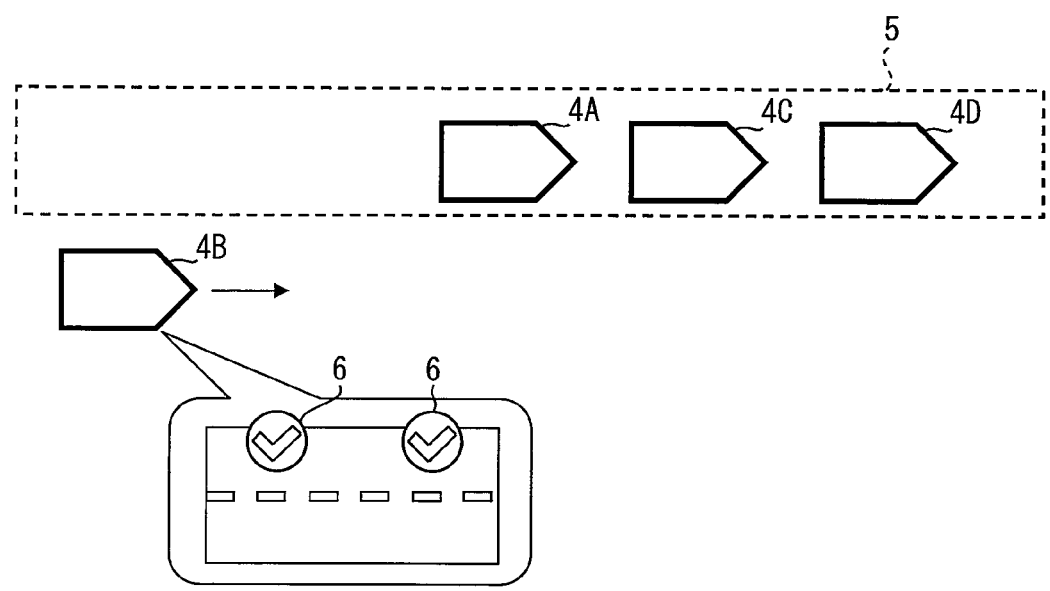
FIG. 17 is a diagram illustrating positions of vehicle and an example of a search result screen by comparison.

FIG. 17 is a diagram illustrating the arrangement of the vehicles 4A, 4C, 4D and a search result screen example by comparison. In FIG. 17, the vehicles 4A, 4C, 4D are parked in the charge parking area 5 so as to line up in a single line. In this regard, because the vehicle 4C does not have the onboard device 20A as shown in FIG. 11, the vehicle 4C is not transmitting the proper parking signal. The vehicles 4A, 4D are transmitting the proper parking signal at constant cycles.

The vehicle 4B of the manager is about to travel on lateral sides of three vehicles 4A, 4C, 4D in a direction parallel to the arrangement of three vehicles 4A, 4C, 4D.

The onboard devices 20A of users mounted to the vehicles 4A, 4D are transmitting the proper parking signals. Thus, when the position of the vehicle 4B of the manager becomes close to these vehicles 4A, 4D, the onboard device 20B of the vehicle 4B of the manager receives the proper parking signals transmitted from the onboard devices 20A (S41: Yes). The onboard device 20B notifies the position of the portable device 30B included in the proper parking signal (S42) to the portable device 30B (S42).

Upon receipt of the position (S51: Yes), the portable device 30B updates the search result screen displayed on the display 33. In the example of FIG. 17, the search result screen is illustrated in the balloon, the starting point of which is the vehicle 4B. In this search result screen, the position of a proper parking FIG. 6 represents the position included in the proper parking signal.

Only two proper parking FIG. 6 are displayed on the search result screen although three vehicles 4A, 4C, 4D of users are parked in the charge parking area 5. Because a distance between the proper parking FIG. 6 is relatively large, it can be determined that the vehicle 4C is a vehicle that is not transmitting the proper parking signal. In this way, the second embodiment can discover the illegally parked vehicle 4C Advantages of Second Embodiment In the above described second embodiment, the onboard device 20A used in the vehicle 4A, 4D of a user cyclically transmits the proper parking signal to the surrounding (S36) during the ACC off (S34: No), specifically, during the parking state. When the onboard device 20B of the vehicle 4B of the manager receives the proper parking signal (S41: Yes), the onboard device 20B transmits the position included in the proper parking signal to the portable device 30B (S42). Upon receipt of the position (S51: Yes), the portable device 30B updates the search result screen (S52).

The vehicle 4C performing illegal conducts does not transmit the proper parking signal to the surrounding. Therefore, by using the portable device 30B, the manager looking around the charge parking area 5 can make a comparison between the position of the proper parking FIG. 6 on the search result screen displayed on the display 33 of the portable device 30B and the vehicle 4 actually parked in the charge parking area 5, and thereby can discover the illegally parked vehicle 4C.

Moreover, in the second embodiment, the proper parking signal is transmitted by using the short range wireless communicator 23, which has a longer communication range as compared with vehicle size. Therefore, the onboard device 20B of the manager can discover the illegally parked vehicle 4C without closely approaching the parked vehicles 4A, 4C, 4D.

Moreover, the transmission cycle of the proper parking signal is longer than the information transmission cycle during traveling. This can reduce a possibility of run-out of a battery resulting from the transmission of the proper parking signal during parking.

Although embodiments in the present disclosure have been illustrated, embodiments in the present disclosure are not limited to those illustrated above. The below-described modifications are also within embodiments in the present disclosure, and further, various modifications are possible within the spirit and scope of the present disclosure.

<First Modification>

In the above embodiments, the charge parking area information is stored in the charge management server 10. Alternatively, this charge parking area information may be stored in the onboard device 20 or the portable device 30.

<Second Modification>

In the above embodiments, a single charge management server 10 performs the processing of the charge amount calculator 111 for all of the charge parking areas. However, this is not limiting. Charge management servers may be provided for respective charge parking areas or for respective multiple groups of charge parking areas close to each other. Each charge management server may have functions of the charge amount calculator 111.

<Third Modification>

Manners of determining the start of the parking state are not limited to those described in the first and second embodiments. The start of the parking state may be determined in various known parking determination manners. For example, the determination may be made based on, in addition to the manners described in the first and second embodiments, on of the parking brake, a change of gear shift position into a parking position, an ignition off, closing of all doors after all occupants of the vehicle get off, locking of all doors after all doors are closed, or combinations of these. Alternatively, when the vehicle is parked in the charge parking area for a predetermined time period or longer, the parking state may be determined.

<Fourth Modification>

In the first and second embodiments, a condition for determining the start of the parking state and a condition for determining the removal of the parking state, i.e., a condition for determining the end of the parking state, have the same basis. Alternatively, different conditions are provided for these. For example, whereas the condition for determining the start of the parking state is kept at that of the above embodiments, the condition for determining the end of parking may be start of vehicle movement.

<Fifth Modification>

In order to discover or prevent illegal conducts that, without transmitting the parking start notification to the charge management serve 10, transmits the proper parking signal to the surrounding, illegal conduct prevention information determined by the charge management server 10 may be transmitted to the surrounding of the vehicle 4 in such a way that the illegal conduct prevention information is included in the proper parking signal.

In this case, when the charge management server 10 receives the parking start notification, the charge management server 10 may transmit the illegal conduct prevention information to the portable device 30 that has transmitted this parking start notification. The illegal conduct prevention information may be a text string that is randomly determined for each parking start notification.

When the onboard device 20B or the portable device 30B of the manager receives the proper parking signal form the onboard device 20A of a user, it may communicate with the charge management server 10 to confirm whether or not the illegal conduct prevention information included in the proper parking signal matches one determined by the charge management server 10.

<Sixth Modification>

In the above embodiments, a charging state is indicated by the charging state screen. Alternatively, the charging state may be indicated by light up of an LED. Alternatively, the charging state may not be indicated.

<Seventh Modification>

In the above embodiments, although the portable device 30 functions as a vehicular parking automatic charging apparatus, the onboard device 20 include the same elements as the portable device 30 except that the display 22 is an LED. Additionally, as described above, the charging state may be indicated by an LED or may not displayed. Therefore, the onboard device 20 is usable as a vehicular parking automatic charging apparatus. Alternatively, like the display 33 of the portable device 30, the display 22 of the onboard device 20 may be used as a display for display screen, and the onboard device 20 may be used as a vehicular parking automatic charging apparatus.

<Eighth Modification>

In the above embodiments, the short range wireless communicator 23 transmits the proper parking signal to the surrounding of the vehicle to inform the surrounding that the charge start process is executed. However, this is not limiting. A wireless communicator having a communication range of several meters or less, which is shorter than the communication range of the short range wireless communicator 23, may be used. For example, a near field communication apparatus may be used to transmit the proper parking signal.

When the communication range is several meters or less, one has to go right next to each vehicle in order to receive the proper parking signal transmitted from the vehicular parking automatic charging apparatus. However, because the proper parking signal is received at a place right next to each other, the proper parking signal may not necessarily include the vehicle position.

<Ninth Modification>

Furthermore, in place of wireless transmission of the proper parking signal, a display such as a LED or the like arranged to be viewable from the outside of the vehicle may be used as a periphery notifier, so that this display can inform the surrounding of the vehicle that the charge start process is executed.

<Tenth Modification>

In the above second embodiment, the onboard device 20 may further wirelessly transmit predetermined information to the surrounding during traveling of the vehicle and a stop of the vehicle. The predetermined information may not be specifically limited. For example, the predetermined information may include the vehicle position.

When a system distinguishes between the vehicle stop and the vehicle parking and does not charge for the vehicle stop even when the vehicle is in the charge parking area, the vehicle making the stop in the charge parking area may not transmit the proper parking signal to the surrounding. Therefore, based on whether or not the proper parking signal is transmitted to the surrounding, a distinction of whether the vehicle is illegally parked vehicle or making a stop cannot be made.

However, when this modification is adopted, the onboard device 20 transmits the information to the surrounding during the vehicle traveling and the vehicle stop. Thus, based on determining whether the short range wireless communicator 23 transmits some sort of radio wave or does not transmit any radio wave, an illegal conduct of transmitting no radio wave can be discovered.

Although embodiments and configurations in the present disclosure have been illustrated above, embodiments and configurations in the present disclosure are not limited to those illustrated above. For example, embodiments and configurations obtained by appropriately combining technical parts disclosed in different embodiments and configurations are also within h embodiments and configurations in the present disclosure.

What is claimed is:

1. A vehicular parking automatic charging apparatus used in a vehicle, comprising:
    a first onboard device installed in the vehicle, the first onboard device having a short range wireless communicator; and
    a portable device in communication with the first onboard device, the portable device having a charge-related communicator configured to perform wireless communication with a charge management server outside of the vehicle;
    wherein:
    the portable device determines whether a position of the vehicle is in a charge parking area when the vehicle is placed in a parking state and transmits to the charge management server a parking start notification indicating that the vehicle started parking in the charge parking area in response to the vehicle being placed in the parking state in the charge parking area, the position of the vehicle being acquired by at least one of the portable device and the first onboard device;
    the portable device, using the charge-related communicator, transmits to the charge management server a parking end notification indicating that the parking state has ended in response to the parking state of the vehicle ending;
    the charge management server receives the parking start notification and transmits illegal conduct prevention information to the portable device in response to the parking start notification, the illegal conduct prevention information including a randomly determined text string;
    the portable device, using the charge-related communicator, receives the illegal conduct prevention information transmitted from the charge management server and communicates the illegal conduct prevention information to the first onboard device;
    the first onboard device, using the short range wireless communicator, transmits a proper parking signal to surroundings of the vehicle after the parking start notification is sent by the portable device and before the parking end notification is sent by the portable device, the proper parking signal including the illegal conduct prevention information; and
    a second onboard device of a manager receives the proper parking signal from the first onboard device and communicates with the charge management server to confirm whether the illegal conduct prevention information included in the proper parking signal matches the illegal conduct prevention information transmitted by the charge management server in response to the parking start notification.

2. The vehicular parking automatic charging apparatus according to claim 1, wherein:
    the first onboard device operates with accessory power of the vehicle and is mounted to the vehicle;
    the portable device operates with a built-in-power source;
    the first onboard device and the portable device, respectively, include mutual wireless communicators that are connectable to each other for performing communications mutually; and
    the portable device determines that the vehicle is placed in the parking state in response to a communication connection between the mutual wireless communicator of the first onboard device and the mutual wireless communicator of the portable device being disconnected.

3. The vehicular parking automatic charging apparatus according to claim 2, wherein:
    the portable device determines that the parking state has ended in response to the communication connection between the mutual wireless communicator of the first onboard device and the mutual wireless communicator of the portable device being reconnected.

4. The vehicular parking automatic charging apparatus according to claim 1, wherein:
    the position of the vehicle is included in at least one of the parking start notification or the parking end notification.

5. The vehicular parking automatic charging apparatus according to claim 4,
    wherein the charge management server includes a storage storing charge parking area information for determining a range of each charge parking area managed by the charge management server and a parking fee for each charge parking area;
    and wherein the charge management server determines the parking fee of the charge parking area in which the vehicle is parked, based on the position of the vehicle included in the parking start notification or the parking end notification transmitted from the portable device, and calculates a charge amount based on the parking fee and a time period from receipt of the parking start notification to receipt of the parking end notification.

6. The vehicular parking automatic charging apparatus according to claim 1, wherein:
the portable device includes a display; and
the portable device causes the display to indicate whether the position of the vehicle is in or out of the charge parking area when the vehicle is not in the parking state, and
causes the display to indicate that charging is occurring when the position of the vehicle is in the charge parking area and the vehicle is in the parking state.

7. A parking area automatic charging system comprising:
an onboard device installed in a vehicle, the onboard device including a short range wireless communicator;
a portable device in communication with the onboard device; and
a manager-side apparatus used by a manager managing a charge parking area, the manager-side apparatus including a manager-side short range wireless communicator, a display, and a display processor;
wherein:
the portable device determines whether a position of the vehicle is in a charge parking area when the vehicle is placed in a parking state, executes a charge start process that starts parking charges in response to the position of the vehicle being in the charge parking area when the vehicle is placed in the parking state, and executes a charge end process that ends parking charges, after execution of the charge start process, in response to the parking state of the vehicle ending, the position of the vehicle being acquired by at least one of the portable device and the onboard device; and
the short range wireless communicator of the onboard device, after execution of the charge start process and before execution of the charge end process, wirelessly transmits a proper parking signal to surroundings of the vehicle indicating that the charge start process is executed, the proper parking signal including the position of the vehicle acquired by the at least one of the portable device and the onboard device, and the position of the vehicle being communicated by the portable device to the onboard device when the position of the vehicle is acquired by the portable device;
the manager-side short range wireless communicator of the manager-side apparatus receives the proper parking signal transmitted from the short range wireless communicator of the onboard device;
the display processor of the manager-side apparatus causes the display to display a proper parking figure indicative of the vehicle transmitting the proper parking signal at a display position that is determined according to the position of the vehicle with the onboard device transmitting the proper parking signal received by the manager-side short range wireless communicator; and
the charge parking area is displayed on a search results screen of the display of the manager-side apparatus and proper parking figures are displayed in the charge parking area on the search results screen enabling the manager to determine an illegally parked vehicle based on a visual comparison between proper parking figures displayed in the charge parking area on the search results screen and vehicles actually parked in the charge parking area.

8. The parking area automatic charging system according to claim 7, wherein:
the short range wireless communicator performs at least one of vehicle-to-vehicle communication or vehicle-to-road-side communication;
during traveling of the vehicle, the short range wireless communicator transmits information at during-traveling cycles which are pre-designated; and
after the execution of the charge start process and before the execution of the charge end process by the portable device, the short range wireless communicator wirelessly transmits the proper parking signal to the surroundings of the vehicle at cycles that are longer than the during-traveling cycles.

9. The parking area automatic charging system according to claim 7, wherein:
the short range wireless communicator performs at least one of vehicle-to-vehicle communication or vehicle-to-road-side communication;
after the execution of the charge start process and before the execution of the charge end process by the portable device, the short range wireless communicator wirelessly transmits the proper parking signal to the surroundings of the vehicle; and
even when the vehicle is traveling and making a stop, the short range wireless communicator wirelessly transmits predetermined information to the surroundings of the vehicle.

* * * * *